United States Patent [19]
Bruns

[11] Patent Number: 6,040,643
[45] Date of Patent: Mar. 21, 2000

[54] LINEAR ACTUATOR

[75] Inventor: Donald G. Bruns, San Diego, Calif.

[73] Assignee: Thermotrex Corporation, San Diego, Calif.

[21] Appl. No.: 09/197,303

[22] Filed: Nov. 20, 1998

Related U.S. Application Data

[60] Provisional application No. 60/066,231, Nov. 20, 1997.

[51] Int. Cl.[7] .............................. H02K 41/00; H02N 2/00
[52] U.S. Cl. ................................. 310/26; 310/12
[58] Field of Search ............................. 310/12, 26, 328; 359/874, 876, 877

[56] References Cited

U.S. PATENT DOCUMENTS

| | | | |
|---|---|---|---|
| 4,456,937 | 6/1984 | Iftikar et al. | 360/106 |
| 4,525,852 | 6/1985 | Rosenberg | 378/34 |
| 4,664,487 | 5/1987 | Tam | 359/874 |
| 4,798,989 | 1/1989 | Miyazaki et al. | 310/328 |
| 5,097,161 | 3/1992 | Nashiki et al. | 310/12 |
| 5,332,942 | 7/1994 | Rennex | 310/328 |

*Primary Examiner*—Nestor Ramirez
*Assistant Examiner*—Judson H. Jones
*Attorney, Agent, or Firm*—Fish & Richardson P.C.

[57] ABSTRACT

An "inch worm" type linear actuator in which high resolution is achieved by directly moving an actuator armature in small steps using thermal, piezoelectric, electromagnetic, or magnetostrictive armature translators. Sequential operation of paired electromagnet clamp assemblies and the armature translator provides a step-wise linear motion. When power is removed, the inventive mechanism prevents further motion of the armature. The preferred embodiment meets these requirements in a compact size having a relative long stroke that is suitable for cryogenic applications, such as moving a segment of a space telescope mirror.

20 Claims, 1 Drawing Sheet

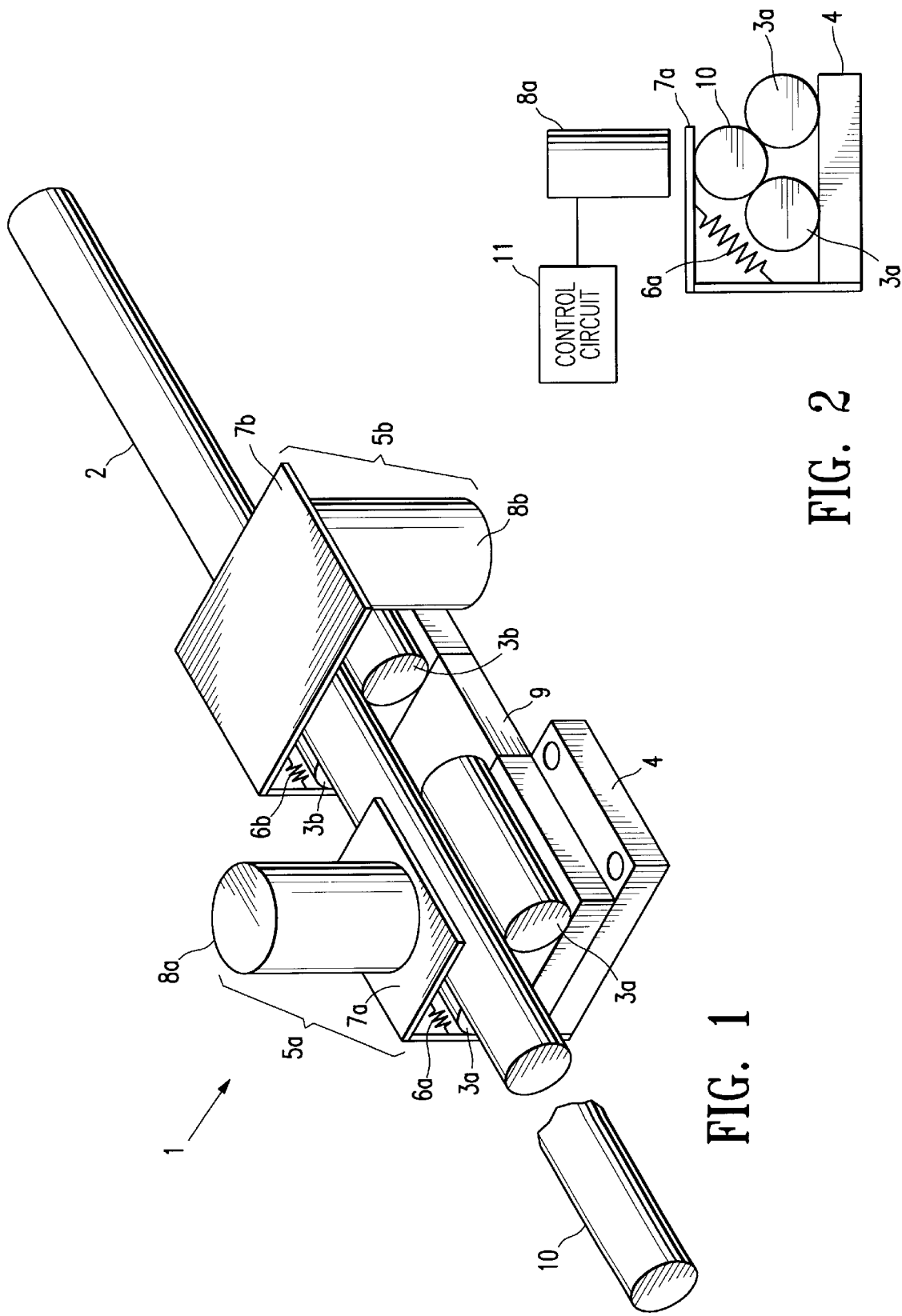

LINEAR ACTUATOR

CLAIM OF PRIORITY

This application claims priority under 35 USC § 119(e) to U.S. patent application Ser. No. 60/066,231, filed Nov. 20, 1997.

TECHNICAL FIELD

This invention relates to linear actuators.

BACKGROUND

Linear actuators are known in the art. The problem addressed by the present invention is a linear actuator design that has high resolution and low backlash, and which can be used in extremely cold environments, such as space.

SUMMARY

The invention includes an "inch worm" type linear actuator in which high resolution is achieved by directly moving an actuator armature in small steps using thermal, piezoelectric, electromagnetic, or magnetostrictive armature translators. Such translators can easily move the armature in nanometer range increments, and can exert very large forces, since they rely on the stiffness of an expanding or contracting material. Sequential operation of paired electromagnet clamp assemblies and the armature translator provides a step-wise linear motion. When power is removed, the inventive mechanism prevents further motion of the armature. The preferred embodiment meets these requirements in a compact size having a relative long stroke that is suitable for cryogenic (e.g., 20–60° K.) applications, such as moving a segment of a space telescope mirror.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a perspective view of a cryogenic linear actuator in accordance with the invention.

FIG. 2 is a front view of the actuator shown in FIG. 1.

DETAILED DESCRIPTION

Overview

FIG. 1 is a perspective view of a cryogenic linear actuator or motor 1 in accordance with the invention. FIG. 2 a front view of the actuator shown in FIG. 1. The actuator armature 2 is preferably a cylindrical rod made of a smooth, rigid, relatively incompressible material that is space-qualified, such as polished, hardened steel, sapphire, ceramic, etc. The armature 2 cylinder is supported and guided by essentially identical forward and aft guide cylinders 3a, 3b in a semi-kinematic design. The forward guide cylinders 3a are affixed in a suitable fashion to a mounting plate 4. Forward and aft electromagnet clamp assemblies 5a, 5b are placed in line and near each other on the mounting plate 4. The armature 2 is positioned within the clamp assemblies 5a, 5b as shown, and is slidably movable fore and aft along the guide cylinders 3a, 3b.

The electromagnet clamp assemblies 5a, 5b each incorporating a suitably strong spring 6a, 6b, a pressure pad 7a, 7b, and an electromagnet 5a, 8b. Each spring 6a, 6b may be configured as a tension or compression spring, and may be of any desired spring type, including a resiliently compressible material. The springs 6a, 6b need not be the same for both electromagnet clamp assemblies 5a, 5b. The pressure pad 7 or some component thereof must be attracted to or repelled by an electromagnet, and thus the pressure pad 7 or some component thereof should be inherently magnetic or attracted to a magnet (e.g., iron or cobalt based material).

Each spring is coupled to its associated pressure pad such that either the spring biases the corresponding pressure pad open such that the pressure pad is closed to a clamped position by actuation of the associated electromagnet ("normally open"), or the spring biases the pressure pad closed such that the pressure pad 7 is opened from a clamped position by actuation of the associated electromagnet ("normally closed"). In particular, in the illustrated embodiment, in the forward electromagnet clamp assembly 5a, the spring 6a biases its pressure pad 7a closed when the associated electromagnet 5a is off, thus clamping the armature 2 against the forward guide cylinders 3a and preventing movement of the armature. In the aft electromagnet clamp assembly 5b, the spring 6b biases its pressure pad 7b open when the associated electromagnet 8b is off, thus requiring the electromagnet 5b to pull the pressure pad 7b closed. Accordingly, the armature 2 is normally free to slide fore or aft along the aft guide cylinders 3b. In an alternative embodiment, the forward electromagnet clamp assembly 5a is normally open, and the aft electromagnet clamp assembly 5b is normally closed.

Between the two electromagnet clamp assemblies 5a, 5b is an armature translator 9 coupled to the mounting plate 4 and to the aft electromagnet clamp assembly 5b and guide cylinders 3b. The armature translator 9 (described in more detail below) expands or contracts a very small amount (on the order of nanometers) to change the distance between the electromagnet clamp assemblies 5a, 5b. By operating the electromagnet clamp assemblies 5a, 5b in one of two sequences, the armature 2 can be moved forward or backward in very small steps.

In a typical embodiment suitable for use in space, the length of the electromagnet clamp assemblies 5a, 5b, and armature translator 9 is on the order of 30 mm, and the width of the structure is on the order of 10 mm. In one embodiment, if the guide cylinders 3a, 3b and the armature translator 9 are each 10 mm long, the armature 2 must be about 40 mm long to achieve a 10 mm stroke. This is adequate to meet the needs of many applications requiring an actuator having high resolution. The total length of the actuator may be somewhat longer than the maximum stroke plus the cylinder length required to guide and hold the armature 2, on the order of about 40–50 mm. A resolution of about 10 nm/step can be achieved for such a design. All of the materials for the device should be space-qualified (e.g., usable at cryogenic temperatures, not exhibiting out gassing, etc.).

To advance the armature 2 in the forward direction, a suitable control circuit 11 (e.g., a microprocessor, control sequencer, or simple state machine) sends the following control sequence to the electromagnet clamp assemblies 5a, 5b and the armature translator 9 to generate an "inch worm" type of movement:

1) Expand the armature translator 9 by the desired step size. The armature 2 is normally clamped by the forward electromagnet clamp assembly 5a, and free to move with respect to the aft electromagnet clamp assembly 5b. This step thus moves the aft electromagnet clamp assembly 5b away from the mounting plate 4.

2) Activate the aft electromagnet clamp assembly 5b to clamp the armature 2 between the aft pressure pad 7b and guide cylinders 3b.

3) Activate the forward electromagnet clamp assembly 5*a* to release the armature 2.

4) Compress or contract the armature translator 9 to substantially its original length.

5) Deactivate the forward electromagnet clamp assembly 5*a* to re-clamp the armature 2 between the forward pressure pad 7*a* and guide cylinders 3*a*.

6) Deactivate the aft electromagnet clamp assembly 5*b* to release the armature 2.

7) Repeat steps 1–6 as many times as required to advance the forward (active) end 10 of the armature 2 to the desired position.

To make the armature 2 retreat, a similar sequence is sent to the electromagnet clamp assemblies 5*a*, 5*b* and the armature translator 9:

1) Activate the aft electromagnet clamp assembly 5*b* to clamp the armature 2.

2) Activate the forward electromagnet clamp assembly 5*a* to release the armature 2.

3) Expand the armature translator 9 by the desired step size.

4) Deactivate the forward electromagnet clamp assembly 5*a* to clamp the armature 2.

5) Deactivate the aft electromagnet clamp assembly 5*b* to release the armature 2.

6) Compress or contract the armature translator 9 to substantially its original length. This step thus moves the aft electromagnet clamp assembly 5*b* towards the mounting plate 4.

7) Repeat 1–6 as many times as required to retract the forward (active) end 10 of the armature 2 to the desired position.

In this manner, the armature 2 has a stroke theoretically limited only by its length. Practically, the stroke may be limited by non-linear effects to lengths comparable to the guide cylinder lengths. The only difficulty in using a much longer armature 2 is that it may become unstable, and straightness problems may limit resolution.

Actuator Component Design Considerations

Important aspects of the preferred embodiment of the invention are the electromagnet clamp assemblies 5*a*, 5*b*, friction of the guide cylinders, and the armature translator 9. The properties of the various components at cryogenic temperatures need to be considered. Enough design margin should be used so that even if the properties change by a factor of two, the design will still work.

In the design of a space-qualified embodiment of the inventive linear actuator, the springs 6*a*, 6*b* against which the electromagnet clamp assemblies 5*a*, 5*b* act should be quite stiff to keep the holding forces as high. Based on experiments, and consistent with theoretical calculations, electromagnets only 6 mm in diameter and 10 mm long, weighing 2 grams, can easily pull 5 newtons. Thus, the springs 6*a*, 6*b* should be able to exert a force of about 5 newtons.

The efficiency of the illustrated device is about 5 newtons/watt at room temperatures, depending on the length of the electromagnet air gap. At cryogenic temperatures, where the ohmic resistance of the electromagnet coil (typically copper wire) falls to 3% (or less) of the room temperature value, this leads to over 150 newtonstwatt. To generate 5 newtons requires 30 mW, and since two electromagnets are required, the total is 60 mW, a level suitable for space applications in terms of power consumption and heat dissipation. If even lower heat dissipation is desired, superconducting wire materials can be used. Since nearly all of the power in the electromagnet is dissipated due to the wire coil, replacing it with a superconductor would practically eliminate heat In any case, since the electronics required to operate the actuator are essentially always fully on or fully off, the driver circuitry is very efficient.

The force generated by a small electromagnet is inversely proportional to the square of the air (or vacuum) gap in the magnetic circuit. The limiting force is determined by the material properties, especially the saturation magnetization. This limiting value determines the smallest dimensions of the electromagnet. For a 6 mm outside diameter assembly, enough magnetic steel can be used to generate 5 newtons at a gap of 20 microns, and still be used well below the saturation point. If necessary, special magnetic alloys can be used, such as Carpenter Hyperco Alloy 50 A. Such materials allow higher magnetic fields in smaller components.

The inverse nature of the forces assists the overall clamp design. The forward spring 6*a* is normally clamped down on the armature 2, and thus prevents motion of the armature 2 when power is removed. Removing the clamping force to let the armature 2 slide requires only a very small movement, so the electromagnet gap can be very small, resulting in very high forces. The entire forward electromagnet clamp assembly 5*a* can be very rigid, since it is part of the actuator structural mounting plate 4. The aft electromagnet clamp assembly 5*b* cannot as easily be made to quite the same tolerances, since when it is in the zero-power state, the pressure pad 7*b* must only lightly touch the armature 2 (if at all). In addition, the aft electromagnet clamp assembly 5*b* should be somewhat lighter since it is attached to the armature translator 9. In this case, however, the aft electromagnet clamp assembly 5*b* is required to pull its pressure pad 7*b* closed. As the pressure pad 7*b* moves closer to the armature 2, the magnetic gap gets smaller and the magnetic force increases, so large forces can still be applied. In this way, both electromagnetic actuators 5*a*, 5*b* can be used very efficiently.

Another important aspect of the linear actuator design is the armature holding force due to friction. Preliminary measurements were made to confirm the feasibility of the design. Using clean polished steel guide (10 mm long, 3 mm diameter) as models for the guide cylinders 3*a*, 3*b* and the armature 2, the coefficient of static friction was measured to be about 0.28 at room temperature. The dynamic coefficient of friction was only slightly lower, about 0.24. Since the coefficients are similar, cold-welding or stiction is not expected to limit the step resolution. Under these conditions, the maximum applied force with 5 newton electromagnets would be about 1.4 newtons.

The force applied when clamping the armature 2 to the guide cylinders 3*a*, 3*b* slightly deforms the contact area, but experiments have shown that stiction or cold-welding effects are small. An estimate of the contact area for two polished steel cylinders with 5 newtons applied over 10 mm gives a 4 micron wide contact area, placing the two cylinders closer by 20 nm. This transverse motion is negligible, and the small contact area eliminates problems with dust.

High step resolution is achievable if the stress on the cylinders is perfectly elastic, so that permanent deformations do not cause permanent local depressions in the cylinders. If this were to happen, when the cylinders are commanded to move a small distance the cylinders will try to fall back into the original groove. By keeping the stresses below the microyield stress point, these small permanent deformations will not occur. For example, for two 10 mm long steel cylinders pressed together with a 5 newton spring, the maximum stress calculates to about 0.2 Gpa. For ordinary steel, the microyield stress is about 0.1 Gpa. This means that such cylinders should be case hardened, but this is a standard technique and will not affect any other part of the design. Other materials, such as sapphire rods, may be used to avoid such stress problem.

Armature Translator

The step resolution of the linear actuator is theoretically determined by the armature translator 9 separating the electromagnet assemblies 5a, 5b. The armature translator 9 preferably should be usable at cryogenic temperatures, provide adequate force to move the armature 2, be low power and robust enough for space applications, not be affected by vacuum, provide the desired step resolution (e.g., 10 nm) reliably, and have an adequate step repetition rate. A suitable armature translator 9 may be implemented as a piezoelectric (PZT), thermal expansion (TE), magnetostrictive (MS), or electromagnetic (EM) device, any of which can provide the necessary forces and resolution.

PZT devices are somewhat fragile and require relatively high voltages but are well characterized and consume essentially no power. At cryogenic temperatures, the stroke is reduced compared to room temperature, but since very small strokes are desirable for many applications (e.g., steering a mirror segment of a space telescope), this technology may be beneficial.

TE devices are relatively rugged, operate at low voltages, and can consume small amounts of power, but may require special metal alloys or plastics to get enough expansion at cryogenic temperatures. For example, the TE device may be a simple block of Vespel, 3 mm on each side. A few millijoules may be required to raise the temperature of the block by a fraction of a degree, expanding the block by about 10 nm.

MS devices can be made with ordinary steels, since the translation requirements are so small. Giant magnetostrictive materials, such as Terfenol-D, have such large coefficients that very small operating powers would be required, and they also operate well at cryogenic temperatures. With activating coils similar in size to the electromagnet described above, the magnetic field strength is large enough to provide 100 micron long strokes in a 10 mm long cylinder. Decreasing this by a factor of 10,000, to get 10 nm strokes, is easily accomplished using lower power. Alternatively, ordinary stainless steels or nickel-steel alloys, which already have magnetostrictive coefficients typically 100–1000 times smaller than Terfenol-d at cryogenic temperatures, may be used to generate a 10 nm stroke.

An EM armature translator design may use the same kind of electromagnet as in the electromagnetic clamping assemblies, but instead pulling against a 0.5 newtons spring. Such a configuration would also accomplish the desired stroke of 10 nm. Such a spring could be a 3 mm long piece of steel with a 7 square mm cross section, which can be incorporated directly into the electromagnet. The advantage of this design is that the electromagnet would already be manufactured in quantity, and thus should be well-characterized and low cost.

Additional advantages

An additional advantage of the linear actuator of the invention is that high reliability is a byproduct of the design. The only moving parts are the armature 2 and the electromagnet assemblies 5a, 5b. The armature 2 is a hard material under relatively small stresses, so its lifetime is essentially unlimited. The electromagnets 8a, 8b have an extremely long lifetime, since they operate under very low power and have no moving parts. The springs 6a, 6b operate over a few micron range, and can be designed to generate stresses much lower than the stress level that would generate metal fatigue.

Another advantage of the linear actuator of the invention is that it only requires a certain amount of energy per step, so the average power can be very low. The peak power is spread over the actuator operating time. The operating time depends primarily on the mechanical resonances of the assembly. For the illustrated embodiment, the mechanical resonance is estimated at 3000 Hz. Each actuation can be accomplished in about 0.01 sec., so the total dissipated energy is on the order of 10 mJ. At cryogenic temperatures, where the resistivity of copper falls to only 3% to 0.1% of the room temperature value, the dissipated energy is reduced to the microjoule regime. If superconducting wires are used, the heat dissipation is negligible.

If position feedback of the armature 2 is desired, a position sensor can be used. A preferred position sensor is a capacitive sensor. In a space application, the active part of capacitor sensors, the electrodes, dissipate essentially no power, since the dielectric is space vacuum.

A number of embodiments of the present invention have been described. Nevertheless, it will be understood that various modifications may be made without departing from the spirit and scope of the invention. Accordingly, other embodiments are within the scope of the following claims.

What is claimed is:

1. A linear actuator including:
   (a) guide structures;
   (b) an armature slidably mounted on the guide structures;
   (c) a normally closed electromagnetic clamp assembly operationally positioned with respect to the armature to prevent sliding movement of the armature when closed and allow sliding movement of the armature when open;
   (d) a normally open electromagnetic clamp assembly operationally positioned with respect to the armature to allow sliding movement of the armature when open and prevent sliding movement of the armature when closed, and spaced apart from the normally closed electromagnetic clamp assembly; and
   (e) a high resolution translator coupled between the normally closed and the normally open electromagnetic clamp assemblies, for changing the spacing between the normally closed and the normally open electromagnetic clamp assemblies;

wherein the armature is selectively extended or retracted with respect to the linear actuator by controlled sequencing of the translator and opening and closing of the normally closed and the normally open electromagnetic clamp assemblies.

2. The linear actuator of claim 1, wherein the normally closed electromagnetic clamp assembly includes,
   (a) a biasing spring;
   (b) a pressure pad, coupled to the biasing spring and positioned adjacent the armature, such that the pressure pad is normally clamped to the armature by the biasing spring; and
   (c) an electromagnet operatively positioned with respect to the pressure pad such that the pressure pad is opened from a normally clamped position by actuation of the electromagnet.

3. The linear actuator of claim 1, wherein the normally open electromagnetic clamp assembly includes,
   (a) a biasing spring;
   (b) a pressure pad, coupled to the biasing spring and positioned adjacent the armature, such that the pressure pad is normally open and spaced apart from the armature by the biasing spring; and (c) an electromagnet operatively positioned with respect to the pressure pad such that the pressure pad is closed to a clamped position by actuation of the electromagnet.

4. The linear actuator of claim 2, wherein the biasing spring may be configured as a tension or compression spring.

5. The linear actuator of claim 3, wherein the biasing spring may be configured as a tension or compression spring.

6. The linear actuator of claim 2, wherein the pressure pad is made of material that is attracted to or repelled by an electromagnet.

7. The linear actuator of claim 3, wherein the pressure pad is made of material that is attracted to or repelled by an electromagnet.

8. The linear actuator of claim 1, further comprising a structural mounting plate operatively positioned with respect to the electromagnetic clamp assemblies such that either one of the electromagnetic clamp assemblies stays fixed to the structure while the other of the electromagnetic clamp assemblies moves with the high resolution translator.

9. The linear actuator of claim 1, wherein the normally closed electromagnetic clamp assembly is a forward assembly and the normally open electromagnetic clamp assembly is an aft assembly.

10. The linear actuator of claim 1, wherein the normally closed electromagnetic clamp assembly is an aft assembly and the normally open electromagnetic clamp assembly is a forward assembly.

11. The linear actuator of claim 1, wherein the high resolution translator is made of piezoelectric, thermal expansion, electromagnetic, or magnetostrictive material.

12. The linear actuator of claim 1, wherein the armature is a cylindrical rod made of a relatively smooth and rigid material.

13. The linear actuator of claim 12, wherein the armature is made of space-qualified material.

14. The linear actuator of claim 1, wherein the guide structures are cylindrical in shape.

15. The linear actuator of claim 14, wherein the guide structures include a forward guide structure and an aft guide structure.

16. The linear actuator of claim 1, further comprising a control circuit that sends control sequences to the electromagnetic clamp assemblies and the high resolution translator to generate a sliding movement.

17. A method for generating a high resolution forward movement of an armature comprising:

(a) expanding a high resolution translator by a desired step size;

(b) activating a normally open aft electromagnetic clamp assembly to clamp the armature between a pressure pad and a guide cylinder;

(c) activating a normally closed forward electromagnetic clamp assembly to release the armature;

(d) contracting the high resolution translator to substantially its original length;

(e) deactivating the normally closed forward electromagnetic clamp assembly to reclamp the armature between the pressure pad and the guide cylinder; and (f) deactivating the normally open aft electromagnetic clamp assembly to release the armature.

18. The method of claim 17, wherein the resolution for the step size is about 10 nm.

19. A method for generating a high resolution backward movement of an armature comprising:

(a) activating a normally open aft electromagnetic clamp assembly to clamp the armature between a pressure pad and a guide cylinder;

(b) activating a normally closed forward electromagnetic clamp assembly to release the armature;

(c) expanding a high resolution translator by a desired step size;

(d) deactivating the normally closed forward electromagnetic clamp assembly to clamp the armature;

(e) deactivating the normally open aft electromagnetic clamp assembly to release the armature; and (f) contracting the high resolution translator to substantially its original length.

20. The method of claim 17, wherein the resolution for the step size is about 10 nm.

* * * * *